United States Patent
Mabry, III et al.

(10) Patent No.: US 6,239,357 B1
(45) Date of Patent: May 29, 2001

(54) FLASHOVER PROTECTION COVER WITH STRESS REDUCTION HINGES

(76) Inventors: Clyde Benton Mabry, III, 1921E New Garden Rd., #105, Greensboro, NC (US) 27410; Sherif I. Kamel, 209 Stillman Creek Dr., Apex, NC (US) 27502; George W. Kayser, 6478-B Buena Vista Dr., Newark, CA (US) 94560

( * ) Notice: Subject to any disclaimer, the term of this patent is extended or adjusted under 35 U.S.C. 154(b) by 0 days.

(21) Appl. No.: 09/249,234

(22) Filed: Feb. 11, 1999

Related U.S. Application Data

(63) Continuation-in-part of application No. 08/988,000, filed on Dec. 10, 1997.

(51) Int. Cl.[7] ................................................. H01B 13/22
(52) U.S. Cl. ........................................ 174/5 R; D13/184
(58) Field of Search ................................. 174/5 R, 40 R, 174/68.3, 95, 97, 101, 135, 136, 138 F, 72 C; D13/184, 133, 155, 156

(56) References Cited

U.S. PATENT DOCUMENTS

| | | | |
|---|---|---|---|
| Re. 24,613 | 3/1959 | Hageltorn | 154/43 |
| 1,224,970 | 5/1917 | Singer . | |
| 1,485,994 * | 3/1924 | Salisbury | 174/5 R |
| 2,408,253 * | 9/1946 | Diebold | 174/5 R |
| 2,770,667 | 11/1956 | Runde | 174/5 |
| 2,927,146 * | 3/1960 | Salisbury | 174/5 R |
| 3,089,915 * | 5/1963 | Plummer | 174/68.3 |
| 3,428,742 | 2/1969 | Smith | 174/136 |
| 3,459,870 * | 8/1969 | Plummer | 174/5 R |
| 3,517,702 * | 6/1970 | Mueller et al. | 174/68.3 |
| 3,587,657 | 6/1971 | Staller | 138/156 |
| 3,786,171 | 1/1974 | Shira | 174/48 |
| 3,846,575 * | 11/1974 | Troy | 174/68.3 |
| 3,900,697 | 8/1975 | Yotsugi | 174/5 R |
| 4,391,303 * | 7/1983 | Holgersson | 174/68.3 |
| 4,399,840 * | 8/1983 | Lee | 138/168 |
| 4,422,478 * | 12/1983 | Pentney et al. | 174/68.3 |
| 4,453,353 | 6/1984 | Killop et al. | 52/147 |
| 4,581,481 | 4/1986 | Moretti | 174/135 |
| 4,628,145 | 12/1986 | Kolcio et al. | 174/5 R |
| 4,944,976 | 7/1990 | Plummer, III | 428/36.9 |
| 5,505,230 | 4/1996 | Bartholomew | 138/164 |
| 5,566,622 * | 10/1996 | Zaylek, Jr. et al. | 174/72 C |
| 5,626,167 | 5/1997 | Streit | 138/118.1 |
| 6,094,792 * | 8/2000 | Frye et al. | 174/5 R |

FOREIGN PATENT DOCUMENTS

| | | |
|---|---|---|
| 2812524A | 9/1979 | (DE) . |
| 1585394A | 1/1970 | (FR) . |
| 571894 * | 1/1958 | (IT) .................... 174/68.3 |

OTHER PUBLICATIONS

Raychem Electrical Products Division, Raysulate Product Handbook, Third Edition, Chapter 3, "Overhead line insulation tapes and covers" No Date.

International Search Report, PCT/US98/25886 (Jun. 4, 1999).

* cited by examiner

Primary Examiner—Dean A. Reichard
Assistant Examiner—Adolfo Nino
(74) Attorney, Agent, or Firm—Myers Bigel Sibley & Sajovec

(57) ABSTRACT

Flashover protection covers are provided in a continuous length for covering power line spans between supporting structures. A flexible panel includes an inner surface and generally parallel opposite edge portions configured to be joined together to enclose a power line. Stress reduction hinges formed within the flashover protection covers facilitate reduced-stress bending of the flashover protection covers.

17 Claims, 7 Drawing Sheets

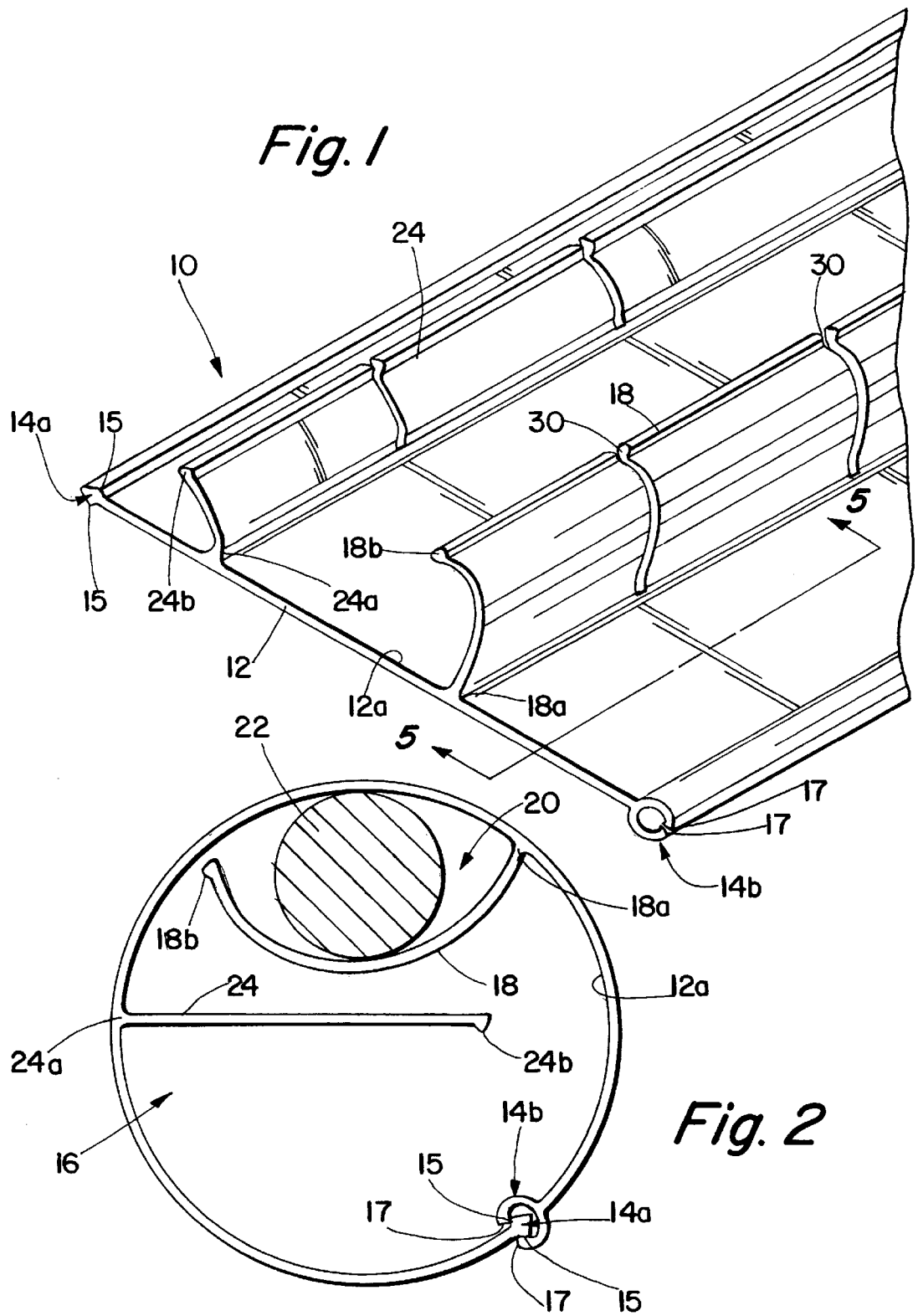

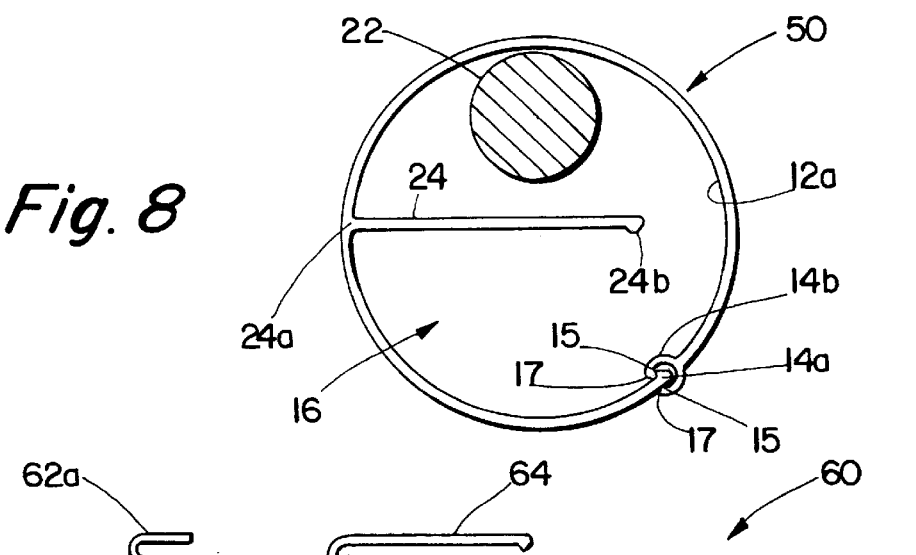
Fig. 8
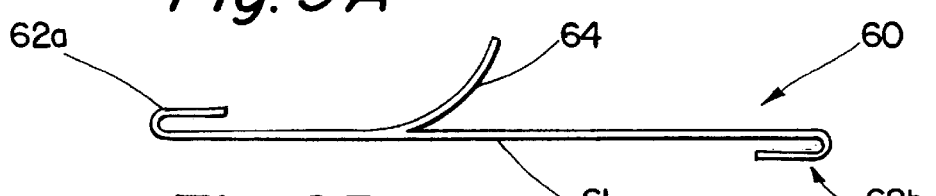
Fig. 9A
Fig. 9B
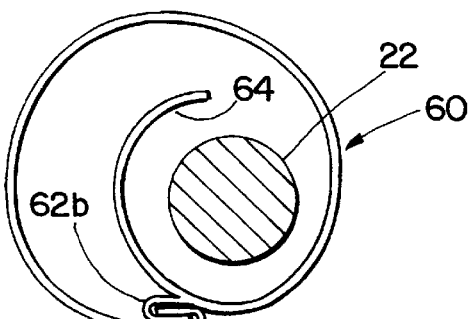
Fig. 9C
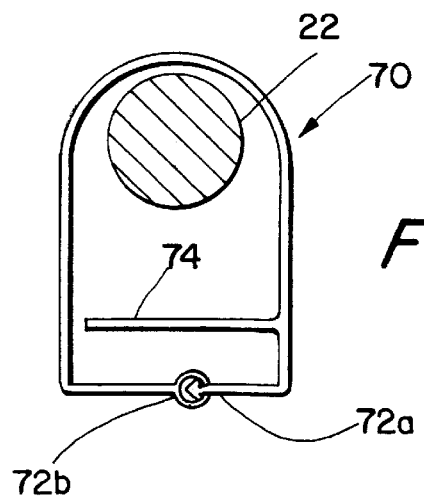
Fig. 10

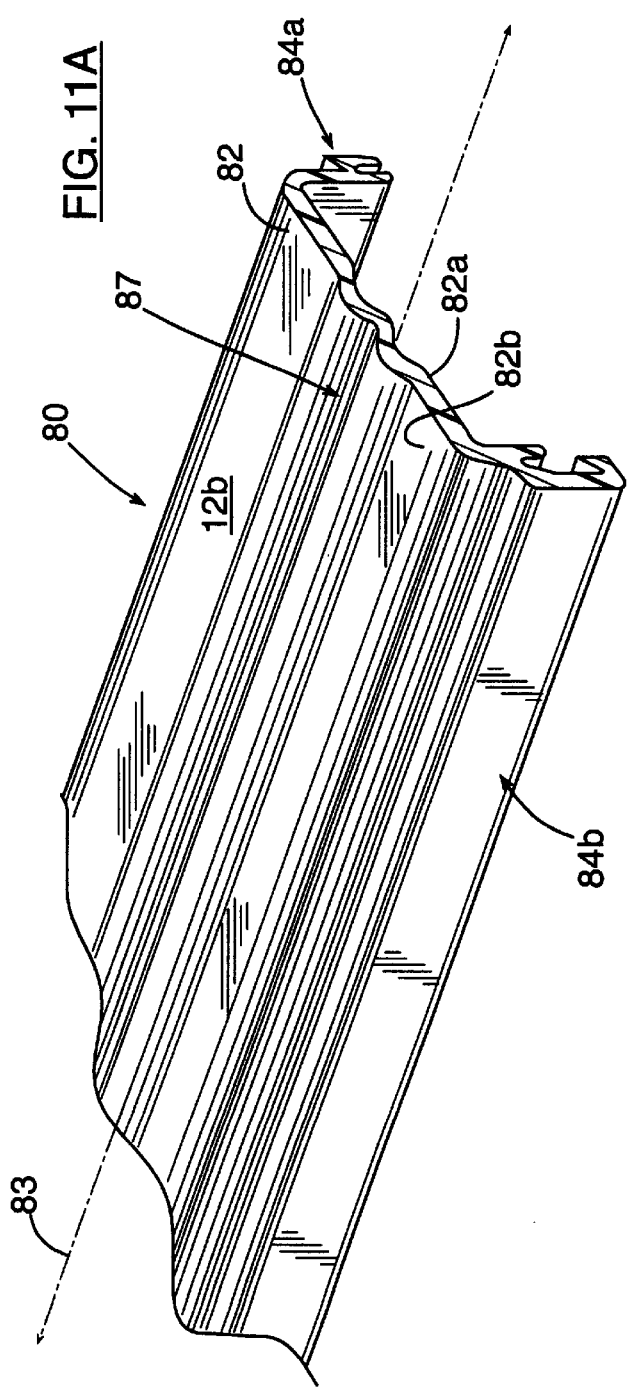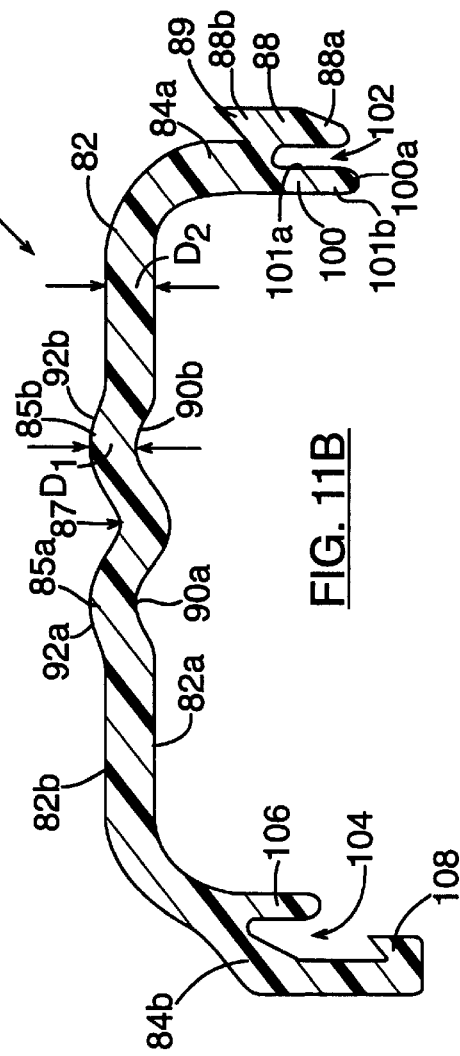

FLASHOVER PROTECTION COVER WITH STRESS REDUCTION HINGES

RELATED APPLICATIONS

This application is a continuation-in-part of co-pending U.S. patent application Ser. No. 08/988,000, filed on Dec. 10, 1997, which is hereby incorporated herein in its entirety by reference.

FIELD OF THE INVENTION

The present invention relates generally to insulating covers and, more particularly, to insulating covers for overhead power transmission lines.

BACKGROUND OF THE INVENTION

Electrical power may be transmitted from a generation source to consumers via overhead conductors strung between towers or poles. Electrical power is typically transmitted in phases wherein multiple conductors are utilized. One or more of these conductors are "hot" conductors carrying a specified amount of alternating current electric power and one conductor serves as a ground. Flashover may result if contact is made between hot conductors or between hot conductors and other grounded objects. Non-grounded contact with a hot conductor, such as when a bird sits upon a hot conductor, typically does not result in flashover.

Because uninsulated conductors are typically less expensive than insulated conductors, many electric power suppliers utilize uninsulated conductors for power transmission. With often hundreds of miles of transmission power lines, the use of uninsulated conductors can result in large cost savings to electric power suppliers. Uninsulated conductors are typically strung between towers or poles such that there is sufficient clearance between the conductors to avoid contact therebetween or with grounded objects.

Although bare conductors may be less expensive to install than insulated conductors, potentially costly problems may arise as a result of their use. Adequate clearances between conductors and/or other grounded objects may not be sustainable during adverse weather conditions (i.e., storms and high winds). As a result, the potential for flashover caused by conductors contacting one another or another object may be increased. Another source of flashover may be caused by large birds and animals which have sufficient size to make contact with a hot conductor and a grounded object or other conductor. In addition, falling trees and tree branches may cause contact between hot conductors and ground, resulting in flashover.

Flashover may result in a power outage which is undesirable to electric power suppliers and to consumers. For existing power transmission systems, electric power suppliers may find it desirable to replace bare conductors with insulated ones in order to eliminate the chance of flashover. Unfortunately, the cost of replacing bare conductors with insulated conductors may be expensive. Furthermore, an interruption in the delivery of power may be required to replace the conductors. This may be economically disadvantageous to an electric power supplier as well as being undesirable to electric power consumers.

Insulating covers for temporary use in protecting workers from live power lines are available. Unfortunately, these insulating covers are typically designed for short term and/or local use. Furthermore, existing covers, such as Applicant's OLIC (Overhead Line Insulating Cover) product line, are typically available only in short lengths, typically ten feet (three meters) and less. Because of their shape and configuration, these temporary covers may be bulky and somewhat difficult to handle in longer lengths. A power line span between supporting towers or poles may exceed hundreds of meters. As a result, many of these temporary covers may be required to cover an entire span. Unfortunately, gaps between adjacent covers would be potential sources of flashover.

SUMMARY OF THE INVENTION

It is, therefore, an object of the present invention to provide covers capable of protecting overhead power transmission lines from flashover caused by contact with a grounded object or another conductor.

It is another object of the present invention to provide flashover protection covers that can be installed on existing power transmission lines without requiring a power outage during installation.

It is yet another object of the present invention to supply flashover protection covers in a continuous configuration so as to cover an entire power transmission line span between supporting structures.

These and other objects are provided, according to one aspect of the present invention, by flashover protection covers provided in continuous lengths that can enclose a live electrical power line within a chamber contained within another chamber. A flexible panel has an inner surface and generally parallel opposite edge portions configured to be joined together to form a first longitudinally extending chamber. A longitudinally extending first wall has an arcuate shape connected along an edge portion thereof to the inner surface of the panel. The first wall also has an opposite free edge portion. The first wall is configured to form a second longitudinally extending chamber within the first chamber. The second longitudinally extending chamber is configured to enclose a power line when the panel edge portions are joined together. The free edge portion of the first wall may abut, or be in close proximity to, the panel inner surface when the panel edge portions are joined together.

A second wall is connected along an edge portion thereof to the inner surface of the panel and includes an opposite free edge portion. The second wall is configured to be longitudinally coextensive with the first chamber. The second wall edge portion is connected to the panel inner surface in generally parallel spaced apart relationship with the first wall edge portion such that the second wall is adjacent to the first wall free edge portion when the panel edge portions are joined together. The second wall inhibits electrical arcing from the power line into the first chamber between the first wall free edge portion and the panel inner surface. The second wall also increases the leakage length of the flashover protection cover.

Flashover protection covers according to the present invention can be provided in continuous lengths sufficient to cover spans of power lines of any length. A plurality of slots are formed in the first and second walls of the cover to facilitate winding or coiling the uninstalled cover around a spool or similar device. A live electrical power line is positioned between the arcuate first wall and the panel inner surface. The panel edge portions are then secured together to enclose the power line within the longitudinally extending chamber defined thereby. The plurality of slots that facilitate providing the cover in a generally flat uninstalled configuration are covered during installation with electrically-insulating material prior to securing the panel edge portions together. As the panel edge portions are secured together, the cover may be advanced along the power line span. Alternatively, a flashover protection cover, according to the present invention, may be applied to a live power line continuously. Installation operations are preferably performed via a remotely-controlled device which is either stationary or movable along a power line span.

According to another aspect of the present invention, flashover protection covers may include stress reduction hinges that facilitate reduced-stress bending of the flashover protection covers. By reducing bending-induced stresses, the stress reduction hinges can help reduce material failures, such as cracking, caused by thinning and/or inducing strain in the material during closing procedures.

Flashover protection covers according to the present invention are advantageous because they can be installed on existing power transmission lines without requiring the power lines to be removed from service. Covers according to the present invention provide electrical insulation sufficient to prevent power line flashover if adjacent power lines touch, such as during high winds, or if a grounded object, such as a tree or animal, makes contact with a power line. By reducing the potential for flashover, the possibility of power outages is diminished. Furthermore, hazards associated with flashover, such as fire, are also diminished.

BRIEF DESCRIPTION OF THE DRAWINGS

FIG. 1 illustrates an uninstalled flashover protection cover for an overhead power transmission line, according to aspects of the present invention.

FIG. 2 is a cross-sectional view of the flashover protection cover of FIG. 1 in an installed configuration enclosing a power transmission line.

FIG. 8 is a cross-sectional view of a flashover protection cover according to another embodiment of the present invention in an installed configuration enclosing a power transmission line.

FIGS. 9A–9B illustrate an uninstalled flashover protection cover for an overhead power transmission line, according to another embodiment of the present invention.

FIG. 9C is a cross-sectional view of the flashover protection cover of FIGS. 9A–9B in an installed configuration.

FIG. 10 is a cross-sectional view of a flashover protection cover according to another embodiment of the present invention.

FIG. 11A is a partial perspective view of an uninstalled flashover protection cover according to another embodiment of the present invention.

FIG. 11B is an end view of the flashover protection cover of FIG. 11A.

DETAILED DESCRIPTION OF THE INVENTION

Figure 3:
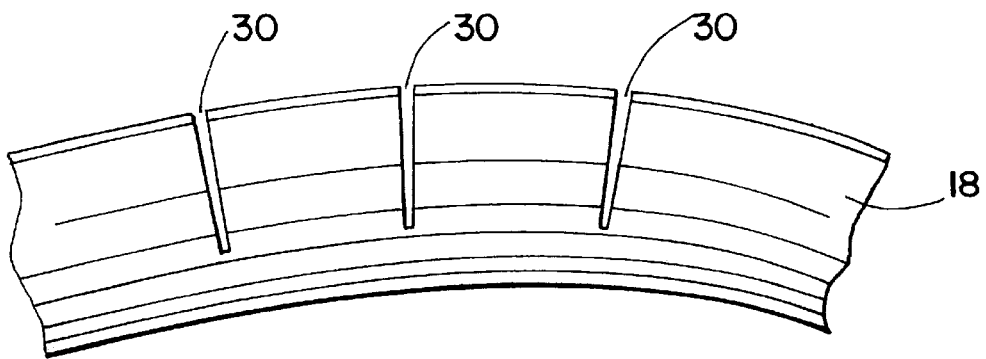
FIG. 3 illustrates slots formed in the wall portions of the flashover protection cover of FIG. 1 which allow the cover in its uninstalled configuration to be wound around a spool.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIGS. 1–2, a flashover protection cover 10 for covering an overhead power transmission line, according to aspects of the present invention, is illustrated in an uninstalled configuration (FIG. 1) and in an installed configuration (FIG. 2). The cover 10 includes a continuous, flexible panel 12 having an inner surface 12a and generally parallel opposite edge portions 14a and 14b. The opposite edge portions 14a, 14b are configured to be joined together to form a first longitudinally extending chamber 16 (FIG. 2).

In the illustrated embodiment, edge portion 14b is configured to removably receive edge portion 14a therewithin. Edge portion 14a has an "arrowhead" configuration with shoulder portions 15 configured to be retained by elastic members 17 of edge portion 14b. The illustrated embodiment provides means for maintaining the panel edge portions 14a, 14b joined together under adverse conditions, while allowing the cover to be removed, if necessary, at a later time. The present invention is not limited to the illustrated embodiment. Alternative closure mechanisms having various shapes may be utilized, including, but not limited to, "L", "C" or "Z" shape closure devices. Alternatively, "hook and loop" fasteners, such as Velcro® brand fasteners (Velcro USA, Inc., Manchester, N.H.) may be utilized to hold the panel edge portions 14a, 14b together. Preferably, an environmental sealant material is applied between the elastic members 17 of edge portion 14b. A preferred sealant material is a low modulus elastomer as described in copending, commonly assigned application of Chang, Ser. No. 08/876,270, filed Jun. 16, 1997, the disclosure of which is incorporated herein by reference.

A longitudinally extending first wall 18 is connected along a first edge portion 18a thereof to the panel inner surface 12a, as illustrated. The first wall 18 has a free edge portion 18b that is generally parallel with the first edge portion 18a. Preferably, the first wall 18 has an arcuate shape. As illustrated in FIG. 2, the first wall 18 is configured to form a second longitudinally extending chamber 20 within the first chamber 16. The second longitudinally extending chamber 20 is configured to enclose a power line 22 when the panel edge portions 14a, 14b are joined together.

As illustrated in FIG. 2, the first wall free edge portion 18b is spaced apart slightly from the panel inner surface 12a when the panel edge portions 14a, 14b are joined together. The first wall may also be configured so that its free edge portion 18b abuts the panel inner surface 12a without any gap therebetween or with as minimal a gap as possible. The first wall 18 is not limited to the illustrated configuration. The first wall 18 may have a non-arcuate shape or may have an arcuate shape different from that illustrated, without departing from the spirit and intent of the present invention.

Still referring to FIGS. 1–2, a second wall 24 is connected along a first edge portion 24a thereof to the panel inner surface 12a, as illustrated. The second wall 24 is preferably configured to be longitudinally coextensive with the first chamber 16 when the panel edge portions 14a, 14b are joined together. The second wall 24 has a free edge portion 24b that is generally parallel with the first edge portion 24a. The second wall 24 and the first wall 18 are connected to the panel inner surface 12a in generally parallel, spaced apart relationship. The second wall 24 is preferably positioned adjacent the first wall free edge portion 18b when the panel edge portions 14a, 14b are joined together. This configuration inhibits electrical flashover or arcing from propagating from the power line 22 into the first chamber 16 between the first wall free edge portion 18b and the panel inner surface 12a. This may result if, for example, a grounded object comes into contact with the cover 10 near the edge portions 14a, 14b. A high stress may exist between the conductor and the grounded object which may result in flashover from the power line 22 to the grounded object between the first wall free edge portion 18b and the panel inner surface 12a.

The present invention is not limited to the illustrated embodiment. Additional walls may be utilized to control potential arcing and flashover from a power line 22 enclosed within the second chamber 20. Furthermore, the cover 10 may have other non-circular cross-sectional configurations. For example, an alternative embodiment of a flashover protection cover 50 is illustrated in FIG. 8, wherein a single wall 24 is utilized. The wall 24 may extend substantially across the diameter of the cover 50. Additionally, the embodiments illustrated in FIGS. 2, 8, 9C, and 10 may include an additional member overlying a gap between a wall free edge portion and the inside surface of the cover. For example, in FIG. 2, an additional member, not shown, may extend from the panel inner surface 12a and overlie the illustrated gap between the second wall free edge portion 24b and the panel inner surface 12a. The additional member provides protection against arcing through the gap. The additional member may have virtually any shape; however, a "U" or "V" shape may be preferred.

Figure 4:
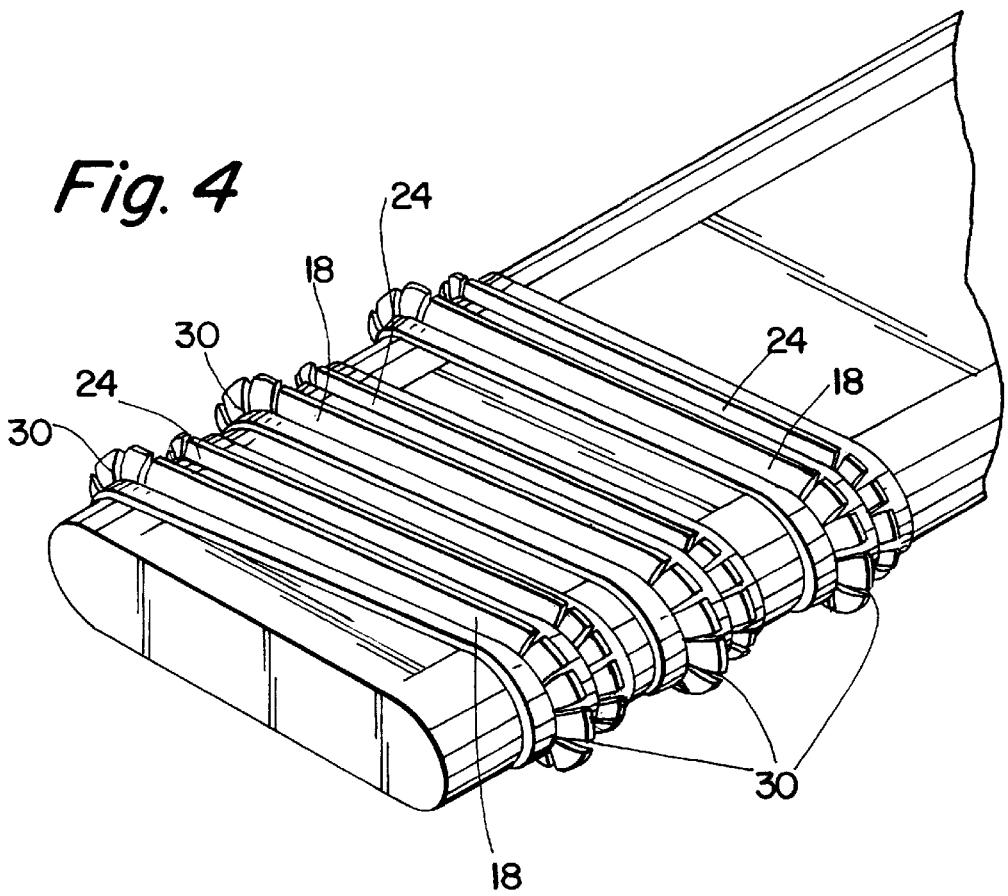
FIG. 4 illustrates the flashover protection cover of FIG. 1 wound around a spool.

Referring now to FIGS. 3–4, a flashover protection cover, according to the present invention, may include a plurality of slots 30 formed in the first and second walls 18, 24. These slots 30 allow the flexible panel 10 with the first and second walls 18, 24 connected thereto to be coiled about a spool or other device. Without the slots 30, it may become difficult to coil any significant length of the panel around a spool without damage to the panel.

Preferably, slots in the first and second walls 18, 24 are formed therein in spaced apart sections, as illustrated in FIG. 4. Because arcing may travel from a power line enclosed within the second chamber 20 through a slot 30, it is desirable to reduce the number of slots 30 required to effectively wind the cover 10 around a spool. In the illustrated embodiment of FIG. 4, slots 30 are formed in the first wall 18 of the cover 10 in repeating increments that facilitate the cover being wound around an elliptical-shaped spool. Various repeating patterns of slots may be utilized such that the cover 10 may be wound around various shapes and sizes of spools or other storage devices while reducing the number of slots 30, without departing from the spirit and intent of the present invention.

Figure 5:
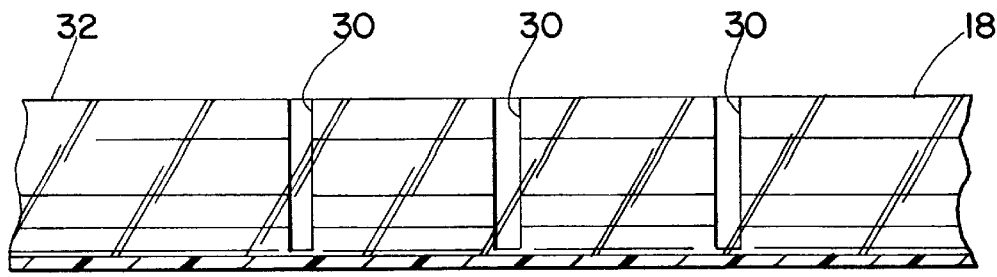
FIG. 5 illustrates insulating material covering the slots in the wall portions of a flashover protection cover.

Preferably, the slots 30 are covered after the cover is unwound from a spool, either prior to or during installation around a power transmission line. As illustrated in FIG. 5, a layer of insulating material 32 may be applied over the slots 30. The insulating material inhibits electrical arcing from passing through the slots 30. In addition, the slots 30 may have an adhesive or other insulating material smeared thereon.

The flexible panel 12 and first and second walls 18, 24 are preferably formed from polymeric material of high dielectric strength including, but not limited to medium or high density polyethylene. In addition, it is preferred that the material out of which the flexible panel 12 and first and second walls 18, 24 are formed have good ultraviolet (UV) radiation protection, have good tracking, erosion, and abrasion resistance. As is known to those skilled in the art, "tracking" is a permanent damage to insulating material that leaves a carbonized conductive path that deteriorates the insulating properties of the material. It is also preferred that the material out of which the flexible panel 12 and first and second walls 18, 24 are formed have a minimum life of 20 years within a 90° C. environment.

Figure 6:
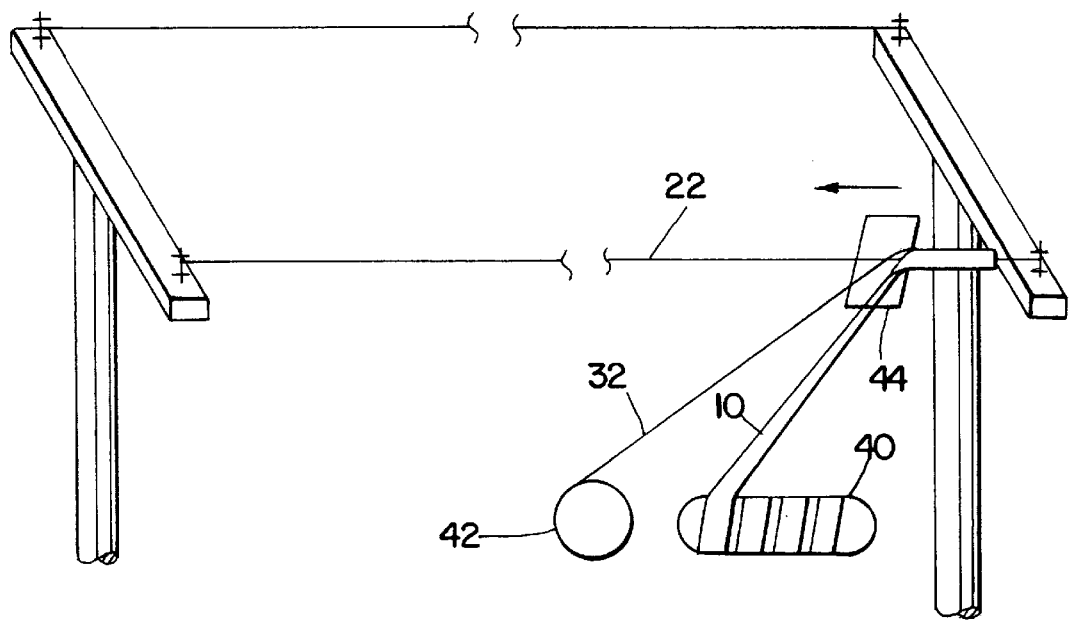
FIG. 6 illustrates enclosing an entire power transmission line span with a flashover protection cover according to the present invention.
Figure 7:
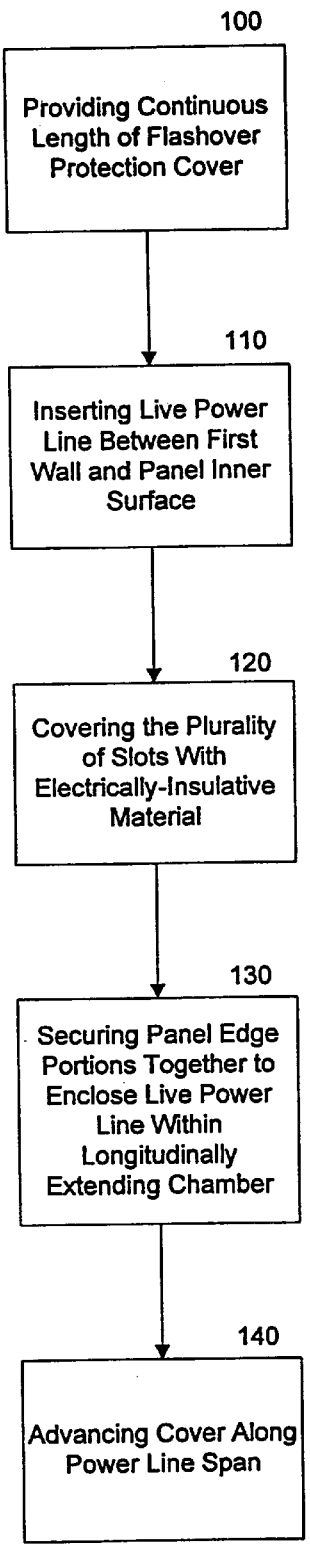
FIG. 7 is a flowchart schematically illustrating operations for enclosing a power transmission line with a flashover protection cover according to the present invention.

Referring now to FIGS. 6–7, operations for applying a flashover protection cover, according to the present invention, to a power transmission line are illustrated. The flashover protection cover 10 is provided in a continuous length, preferably wound about a spool 40, or other means of delivery. Material 32 for covering portions of the cover having slots therein is preferably provided via a spool 42, or other means of delivery. A remotely-controlled installation tool 44 applies the insulating material 32 over the slots and encloses the cover 10 around the power line 22 as described above. The installation tool continuously moves along the span of the power line 22 performing the installation operations. Alternatively, the installation tool 44 may be stationary and the installed cover is advanced along the power line span.

The installation tool serves as means for performing the functions of inserting a live electrical power line between the arcuate first wall and the panel inner surface. The installation tool also serves as means for performing the functions of securing the panel edge portions 14a, 14b together to enclose a live electrical power line within the longitudinally extending chamber 20, and for covering the plurality of slots 30 with electrically-insulative material 32 prior to securing the panel edge portions together.

The above-described operations for installing a flashover protection cover on a live power line are schematically illustrated in FIG. 7. A continuous length of flashover protection cover is provided to an installation tool (Block 100). A live power line 22 is inserted between the first wall 18 and the panel inner surface 12a (Block 110). Slots 30 within portions of the first and second walls are covered with insulating material 32 (Block 120). The panel edge portions 14a, 14b are secured together to enclose the live power line therewithin (Block 130). The installed cover may then be advanced along the power line span (Block 140).

Installation operations are preferably performed via a remotely-controlled installation device which is either stationary or movable along a power line span. As the flashover protection cover is paid off a spool and onto a conductor, the installation tool will snap the panel edge portions 14a, 14b together and preferably move the cover down the power line span. Alternatively, the installation tool may be configured to "travel" the power line span as it secures a flashover protection cover thereto. However, flashover protection covers, according to the present invention may be installed manually, as well.

The present invention is advantageous because a flashover protection cover can be supplied in a continuous length to cover long spans of power transmission lines. Preferably, flashover protection covers according to the present invention can be supplied in any length so as to cover entire conductor spans. The present invention may be utilized to cover power transmission lines up to and exceeding 25 millimeters in diameter and operating at up to and exceeding 25,000 volts, without limitation.

Referring now to FIGS. 9A–9C, a flashover protection cover 60 for an overhead power transmission line, according to another embodiment of the present invention is illustrated. FIGS. 9A and 9B illustrate the flashover cover 60 in an uninstalled configuration. FIG. 9C is a cross-sectional view of the flashover protection cover 60 in an installed configuration. The cover 60 includes a panel 61 having opposite end portions 62a and 62b. A formable member 64 extends from the panel 61 between the end portions 62a, 62b as illustrated. The member 64 may be configured so as to obtain an arcuate shape when the end portions 62a and 62b are connected as illustrated in FIG. 9C. Alternatively, the member 64 may be thermoformable during installation. The illustrated end portions 62a and 62b have an arcuate shape and are configured to interlock as illustrated in FIG. 9C to secure the cover 60 around an electrical conductor 22.

FIG. 10 is a cross-sectional view of a flashover protection cover 70, according to another embodiment of the present invention. The illustrated cover 70 has a "bell" shape and includes a wall 74 extending across the inside diameter of the cover. End portions 72a and 72b are configured to engage when the cover 70 is installed around an electrical conductor 22. Alternatively, the portion of the illustrated cover 70 including the wall 74 and end portions 72a and 72b may have a reduced diameter compared with the portion of the cover immediately surrounding the electrical conductor 22.

Referring now to FIG. 11A, an exemplary flashover protection cover 80 according to another embodiment of the present invention is illustrated. The flashover protection cover 80 includes an elongated flexible panel 82 that defines a longitudinal direction (indicated by arrow 83). The flashover protection cover 80 has opposite first and second surfaces 82a, 82b, generally parallel, opposite first and second edge portions 84a, 84b, and a medial portion 87 between the first and second edge portions 84a, 84b, as illustrated. The first and second edge portions 84a, 84b are configured to be joined together such that the first surface 82a forms a longitudinally extending chamber 86 (FIG. 12C) configured to enclose an electrical power line 22 extending along the longitudinal direction 83. The second surface 82b forms an outer surface of the flashover protection cover 80.

Referring to FIG. 11B, the flashover protection cover 80 includes a pair of longitudinally extending stress reduction hinges 85a, 85b integrally formed within the medial portion 87 of the elongated panel 82, as illustrated. Each stress reduction hinge 85a, 85b has an arcuate cross-sectional configuration that facilitates reduced-stress bending of the flexible panel 82 along the longitudinal direction 83 to join the first and second edge portions 84a, 84b together. By reducing bending-induced stresses, the stress reduction hinges 85a, 85b help reduce material failures, such as cracking, caused by thinning and/or inducing strain in the material in the medial portion 87 of the elongated panel 82 during closing procedures.

In the illustrated embodiment, each stress reduction hinge 85a, 85b includes a respective longitudinally extending channel 90a, 90b formed within the panel first surface 82a. Each stress reduction hinge 85a, 85b also includes a respective convex surface 92a, 92b that projects outwardly from the panel second surface 82b and overlies a respective longitudinally extending channel 90a, 90b, as illustrated. Preferably, each stress reduction hinge 85a, 85b has a cross-sectional thickness $D_1$ approximately equal to a cross-sectional thickness $D_2$ of the flexible panel medial portion 87.

Still referring to FIG. 11B, the first edge portion 84a comprises a first male member 88, a wall or creepage extender 100 having a free end 100a, and a first female member 102 between the first male member 88 and the creepage extender 100, as illustrated. The first male member 88 has a leading end 88a and an opposite trailing end 88b, as illustrated. The leading end 88a has a tapered or cuneately-shaped configuration such that a cross-sectional thickness thereof decreases in a direction away from the trailing end 88b. The trailing end 88b includes a first barb 89 that extends in a direction away from the leading end 88a, as illustrated.

The second edge portion 84b includes a second female member 104 and an adjacent second male member 106, as illustrated. The second female member 104 has a shape complimentary to the first male member 88 on the first edge portion 84a. The second female member 104 includes a second barb 108 that is configured to interlock with the first barb 89 of the first male member 88 (FIG. 12C). The second male member 106 is configured to matingly engage with the first female member 102, as illustrated in FIG. 12C. The creepage extender 100 has opposite first and second faces 101a, 101b such that, when the first male member 88 and second female member 104 are matingly engaged, the creepage extender first face 101a is in adjacent relationship with the second male member 106 and the creepage extender second face 101b is in adjacent relationship with an electrical power line 22 extending through the chamber 86, as illustrated in FIG. 12C. The first female member 102 may contain an electrical sealant (110 FIG. 12C) therein to maintain electrical integrity.

Figure 12A:
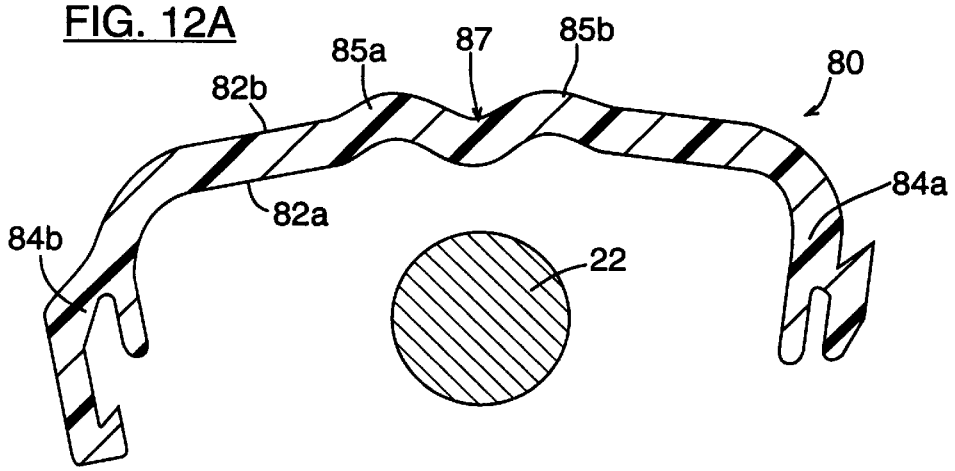
FIG. 12A is an end view of the flashover protection cover of FIG. 11A in an open position around an electric power line.
Figure 12B:
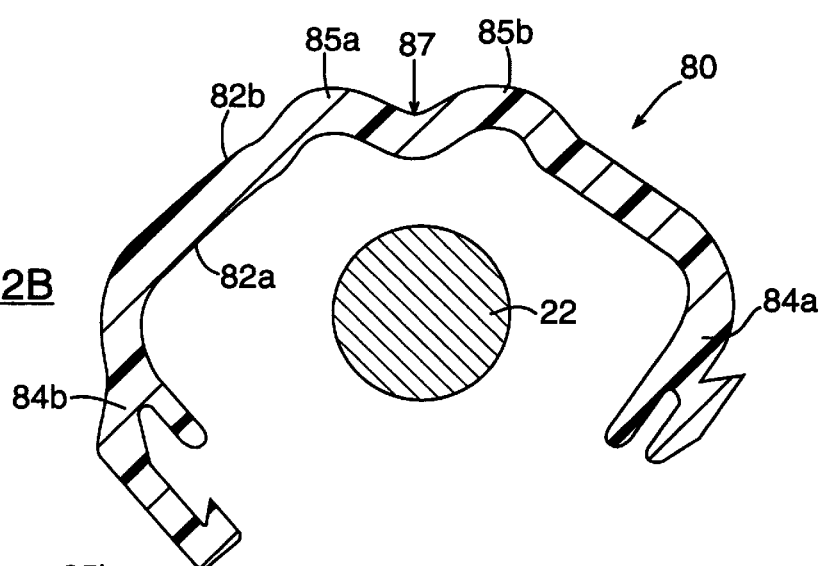
FIG. 12B is an end view of the flashover protection cover of FIG. 11A in an intermediate stage of closure around a electric power line.
Figure 12C:
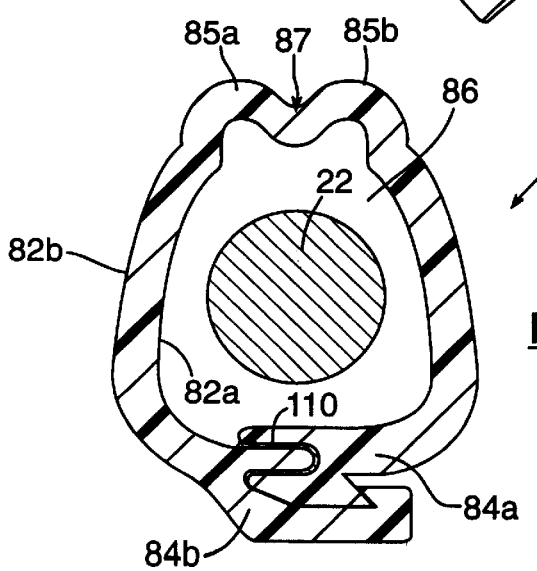
FIG. 12C is an end view of the flashover protection cover of FIG. 11A in an installed position around an electric power line.

Referring now to FIGS. 12A–12C, an end view of the flashover protection cover 80 is illustrated in various stages of closure around a power line 22. The flashover protection cover 80 bends preferentially along the stress reduction hinges 85a, 85b such that the end portions 84a, 84b move towards each other (FIG. 12B) and eventually becoming interconnected, as illustrated in FIG. 12C. Because of the arcuate configuration of each stress reduction hinge 85a, 85b, bending forces are distributed over a greater area of the elongated panel medial portion 87, thereby reducing bending stresses.

Preferably, each of the above-described flashover protection covers are resistant to ultraviolet (UV) radiation, and have good tracking, erosion, and abrasion resistance. It is also preferred that materials out of which insulation enhancement covers, according to the present invention, are formed have a minimum life of 20 years within a 90° C. environment.

Although it is preferable that an electrical power line span be covered with a single cover according to the present invention, multiple covers may be utilized. A connector may be utilized to join multiple adjacent covers together along a span.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A flashover protection cover for an electrical power line, comprising:

an elongated flexible panel defining a longitudinal direction and having opposite first and second surfaces, generally parallel opposite edge portions, and a medial portion between the opposite edge portions, wherein the edge portions are configured to be joined together such that the first surface forms a longitudinally extending chamber configured to enclose an electrical power line extending therethrough, wherein the opposite edge portions extend along a first direction when the elongated flexible panel is in a relaxed condition, and wherein the opposite edge portions extend along a second direction substantially transverse to the first direction when joined together; and at least one longitudinally extending stress reduction hinge integrally formed within the elongated flexible panel medial portion, wherein the at least one longitudinally extending stress reduction hinge has an arcuate cross-sectional configuration that facilitates reduced-stress bending of the flexible panel along the longitudinal direction to join the opposite edge portions together.

2. A flashover protection cover according to claim 1 wherein the at least one longitudinally extending stress reduction hinge comprises a longitudinally extending channel formed within the panel first surface.

3. A flashover protection cover according to claim 2 wherein the at least one longitudinally extending stress reduction hinge further comprises a convex surface that projects outwardly from the panel second surface and that overlies the longitudinally extending channel.

4. A flashover protection cover according to claim 1 wherein the at least one longitudinally extending stress reduction hinge comprises a pair of adjacent longitudinally extending stress reduction hinges.

5. A flashover protection cover according to claim 1 wherein the at least one longitudinally extending stress reduction hinge has a cross-sectional thickness approximately equal to a cross-sectional thickness of the flexible panel medial portion.

6. A flashover protection cover according to claim 1 wherein said flexible panel is formed from polymeric material of high dielectric strength.

7. A flashover protection cover for an electrical power line, comprising:

an elongated flexible panel defining a longitudinal direction and having opposite first and second surfaces, generally parallel opposite first and second edge portions, and a medial portion between the opposite first and second edge portions, wherein the first and second edge portions are configured to be joined together such that the first surface forms a longitudinally extending chamber configured to enclose an electrical power line extending therethrough;

wherein the first edge portion comprises a first male member, a wall having a free end, and a first female member between the first male member and the wall, and wherein the first male member comprises a leading end and an opposite trailing end, wherein the leading end has a tapered configuration such that a cross-sectional thickness thereof decreases in a direction away from the trailing end, and wherein the trailing end includes a first barb extending in a direction away from the leading end;

wherein the second edge portion comprises a second female member and an adjacent second male member;

wherein the second female member has a shape complimentary to the first male member and includes a second barb configured to interlock with the first barb of the first male member;

wherein the second male member is configured to matingly engage with the first female member;

wherein the wall has opposite first and second faces such that, when the first male member and second female member are matingly engaged, the wall first face is in adjacent relationship with the second male member and the wall second face is in adjacent relationship with an electrical power line extending through the chamber; and at least one longitudinally extending stress reduction hinge integrally formed within the elongated flexible panel medial portion, wherein the at least one longitudinally extending stress reduction hinge has an arcuate cross-sectional configuration that facilitates reduced-stress bending of the flexible panel along the longitudinal direction to join the opposite edge portions together.

8. A flashover protection cover according to claim 7 wherein the at least one longitudinally extending stress reduction hinge comprises a longitudinally extending channel formed within the panel first surface.

9. A flashover protection cover according to claim 8 wherein the at least one longitudinally extending stress reduction hinge further comprises a convex surface that projects outwardly from the panel second surface and that overlies the longitudinally extending channel.

10. A flashover protection cover according to claim 7 wherein the at least one longitudinally extending stress reduction hinge comprises a pair of adjacent longitudinally extending stress reduction hinges.

11. A flashover protection cover according to claim 7 wherein the at least one longitudinally extending stress reduction hinge has a cross-sectional thickness approximately equal to a cross-sectional thickness of the flexible panel medial portion.

12. A flashover protection cover according to claim 7 wherein said flexible panel is formed from polymeric material of high dielectric strength.

13. A flashover protection cover according to claim 7 wherein the first female member contains an electrical sealant therein.

14. A flashover protection cover for an electrical power line, comprising:

an elongated flexible panel defining a longitudinal direction and having opposite first and second surfaces, generally parallel opposite first and second edge portions, and a medial portion between the opposite first and second edge portions, wherein the first and second edge portions are configured to be joined together such that the first surface forms a longitudinally extending chamber configured to enclose an electrical power line extending therethrough;

wherein the first edge portion comprises a first male member, a wall having a free end, and a first female member between the first male member and the wall, and wherein the first male member comprises a leading end and an opposite trailing end, wherein the leading end has a tapered configuration such that a cross-sectional thickness thereof decreases in a direction away from the trailing end, and wherein the trailing end includes a first barb extending in a direction away from the leading end;

wherein the second edge portion comprises a second female member and an adjacent second male member;

wherein the second female member has a shape complimentary to the first male member and includes a second barb configured to interlock with the first barb of the first male member;

wherein the second male member is configured to matingly engage with the first female member;

wherein the wall has opposite first and second faces such that, when the first male member and second female member are matingly engaged, the wall first face is in adjacent relationship with the second male member and the wall second face is in adjacent relationship with an electrical power line extending through the chamber;

a pair of adjacent, longitudinally extending stress reduction hinges integrally formed within the elongated flexible panel medial portion;

wherein each longitudinally extending stress reduction hinge has an arcuate cross-sectional configuration that facilitates reduced-stress bending of the flexible panel therealong to join the opposite edge portions together; and wherein each longitudinally extending stress reduction hinge comprises:

a longitudinally extending channel formed within the panel first surface; and a convex surface that projects outwardly from the panel second surface and that overlies the longitudinally extending channel.

15. A flashover protection cover according to claim 14 wherein at least one of the longitudinally extending stress reduction hinges has a cross-sectional thickness at least equal to a cross-sectional thickness of the flexible panel medial portion.

16. A flashover protection cover according to claim 14 wherein said flexible panel is formed from polymeric material of high dielectric strength.

17. A flashover protection cover according to claim 14 wherein the first female member contains an electrical sealant therein.

* * * * *